(12) United States Patent
Abouimrane et al.

(10) Patent No.: US 9,005,808 B2
(45) Date of Patent: Apr. 14, 2015

(54) ELECTRODE MATERIALS FOR RECHARGEABLE BATTERIES

(75) Inventors: Ali Abouimrane, Naperville, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 154 days.

(21) Appl. No.: 13/404,191

(22) Filed: Feb. 24, 2012

(65) Prior Publication Data

US 2012/0225352 A1  Sep. 6, 2012

Related U.S. Application Data

(60) Provisional application No. 61/448,043, filed on Mar. 1, 2011.

(51) Int. Cl.
| | | |
|---|---|---|
| *H01M 4/13* | (2010.01) | |
| *H01M 4/36* | (2006.01) | |
| *H01B 1/18* | (2006.01) | |
| *H01M 4/58* | (2010.01) | |
| *H01M 4/587* | (2010.01) | |
| *H01M 4/60* | (2006.01) | |
| *B82Y 30/00* | (2011.01) | |

(52) U.S. Cl.
CPC ........... *H01M 4/364* (2013.01); *H01B 1/18* (2013.01); *H01M 4/58* (2013.01); *H01M 4/5815* (2013.01); *H01M 4/587* (2013.01); *H01M 4/60* (2013.01); *H01M 4/606* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 3,488,221 A | 1/1970 | Shimotake et al. | |
| 3,666,500 A | 5/1972 | Lange et al. | |
| 3,666,560 A | 5/1972 | Cairns et al. | |
| 3,791,867 A | 2/1974 | Broadhead et al. | |
| 3,864,167 A | 2/1975 | Broadhead et al. | |
| 4,258,109 A * | 3/1981 | Liang et al. .................. 429/323 |
| 4,287,268 A | 9/1981 | Coetzer | |
| 4,407,912 A | 10/1983 | Virkar et al. | |
| 4,476,204 A | 10/1984 | Auborn | |
| 4,544,614 A | 10/1985 | Kucera et al. | |
| 4,659,637 A | 4/1987 | Nelson et al. | |
| 4,833,048 A | 5/1989 | Dejonghe et al. | |
| 4,895,776 A | 1/1990 | Virkar et al. | |
| 5,162,175 A | 11/1992 | Visco et al. | |
| 5,516,598 A | 5/1996 | Visco et al. | |
| 5,529,860 A | 6/1996 | Skotheim et al. | |
| 5,532,077 A | 7/1996 | Chu | |
| 5,601,947 A | 2/1997 | Skotheim et al. | |
| 5,928,812 A * | 7/1999 | Xue ............................ 429/304 |
| 6,117,590 A | 9/2000 | Skotheim et al. | |
| 6,210,831 B1 | 4/2001 | Gorkovenko et al. | |
| 6,245,464 B1 | 6/2001 | Spillman et al. | |
| 6,300,009 B1 | 10/2001 | Yoshida et al. | |
| 6,309,778 B1 | 10/2001 | Skotheim et al. | |
| 6,319,633 B1 | 11/2001 | Ikeda et al. | |
| 6,376,127 B1 | 4/2002 | Teranishi et al. | |
| 6,406,814 B1 | 6/2002 | Gorkovenko et al. | |
| 6,991,662 B2 * | 1/2006 | Visco et al. .................. 29/623.4 |
| 7,645,539 B2 | 1/2010 | Koshina et al. | |
| 2005/0106460 A1 | 5/2005 | Otsuki et al. | |
| 2007/0238014 A1 * | 10/2007 | Koshina et al. ............... 429/105 |
| 2008/0032192 A1 | 2/2008 | Yokomizo et al. | |
| 2009/0202914 A1 | 8/2009 | Kepler et al. | |

FOREIGN PATENT DOCUMENTS

WO  WO-2009/114314  9/2009

OTHER PUBLICATIONS

Kotkata, M.F. et al, "A Study of the Electrical Conductivity of Amorphous—Crystalline Selenium Mixtures", Materials Science and Engineering, 95, 1987, pp. 287-293.

Abouimrane, Ali et al., "A New Class of Lithium and Sodium Rechargeable Batteries Based on Selenium and Selenium-Sulfur as a Positive Electrode," Journal of the American Chemical Society, Feb. 25, 2012, vol. 134, pp. 4505-4508.

International Search Report and Written Opinion for Application No. PCT/US2012/026889 dated Aug. 22, 2012 (14 pages).

* cited by examiner

*Primary Examiner* — Carlos Barcena
*Assistant Examiner* — Wojciech Haske
(74) *Attorney, Agent, or Firm* — Foley & Lardner LLP (57) ABSTRACT

Selenium or selenium-containing compounds may be used as electroactive materials in electrodes or electrochemical devices. The selenium or selenium-containing compound is mixed with a carbon material.

12 Claims, 8 Drawing Sheets

ELECTRODE MATERIALS FOR RECHARGEABLE BATTERIES

CROSS-REFERENCE TO RELATED APPLICATIONS

This application claims the benefit of U.S. Provisional Patent Application No. 61/448,043, filed on Mar. 1, 2011, the entire disclosure of which is incorporated herein by reference for any and all purposes.

STATEMENT OF GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The present technology is generally related to rechargeable batteries. In particular, it is related to electrode materials which include selenium.

BACKGROUND

As the evolution of batteries continues, and particularly as lithium batteries become more widely accepted for a variety of uses, the need for safe, long-lasting, high-energy batteries becomes more important. There has been considerable interest in recent years in developing high energy density cathode-active materials for use in high energy primary and secondary batteries. For example, lithium-sulfur based materials can reach a specific capacity equal to 1670 mAh/g, which is one order of magnitude higher than for $LiCoO_2$. Unfortunately, lithium sulfur batteries have traditionally suffered from low sulfur utilization resulting in a low capacity and severe capacity fade, resulting in short battery lifetimes. Additionally, lithium sulfur batteries are typically operated in the molten state, thus high temperature operation is needed. The poor cycleability of lithium sulfur batteries is mainly due to its insulating character and the solubility of intermediary polysulfides during the charge-discharge process.

Lithium selenium batteries, using molten salt eutectics such as LiF—LiCl—LiI (see U.S. Pat. No. 3,488,221) or a mixture of $LiAlO_2$ and LiF—LiCl—LiI eutectics (see U.S. Pat. No. 3,666,500), have been described, but which operate only in the molten state of the salt, at high temperature (e.g. above 285° C.). A battery based upon $Li_2Se/Li$ was also investigated using a fluidic positive electrode (e.g. 1M $Li_2Se$ in a mixture of ethylene carbonate and ethyl methyl carbonate (volume ratio 1 to 1)) (see U.S. Pat. No. 7,645,539). However, neither of these approaches is of practical use due to the extreme operating temperatures and safety issues of liquid or molten electrodes.

SUMMARY

In one aspect, a material is provided including selenium, a selenium-containing compound, selenium-carbon composite, a selenium-containing compound-carbon composite, or a mixture thereof; where the material is an electroactive material at a temperature of below 280° C. In some embodiments, the material is an electroactive material at a temperature from about −100° C. to about 150° C. In some embodiments, the material is an electroactive material at a temperature from about 0° C. to about 100° C. In some embodiments, the material includes selenium.

Where the material includes the selenium-carbon composite, or selenium-containing compound-carbon composite, the carbon may include synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, or graphene.

In some embodiments, the material also includes a further carbon material termed a carbon electronic conductor. As used herein, the term "carbon electronic conductor" is used to designate the carbon material that may be added to the selenium, the selenium-containing compound, the selenium-carbon composite, and/or the selenium-containing compound-carbon composite. For the latter two composite materials, the carbon electronic conductor may also be the same as, or different than the carbon used in the composites. In some embodiments, the carbon electronic conductor includes synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene. Thus, the material, in various embodiments may include, but is not limited to, selenium and a carbon electronic conductor; a selenium-containing compound and a carbon electronic conductor; a selenium-carbon composite and a carbon electronic conductor; or a selenium-containing compound-carbon composite and a carbon electronic conductor.

In another aspect, an electrode is provided including the material including selenium, a selenium-containing compound, selenium-carbon composite, a selenium-containing compound-carbon composite, or a mixture thereof; and a current collector; where the electrode is configured to operate at a temperature of less than 280° C. In some embodiments, the electrode is configured to operate at a temperature of less than 200° C. In some embodiments, the electrode is configured to operate at a temperature from about −100° C. to about 150° C. In some embodiments, the electrode is configured to operate at a temperature from about 0° C. to about 100° C. In some embodiments, the electrode also includes a carbon electronic conductor which may be synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene.

In some embodiments, the electrode also includes a binder. The binder may include polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, a copolymer of any two or more such polymers, or a blend of any two or more such polymers.

In another aspect, an electrochemical device is provide that includes a cathode, wherein the cathode includes a material which includes selenium, a selenium-containing compound, selenium-carbon composite, a selenium-containing compound-carbon composite, or a mixture thereof. In some embodiments, the electrochemical device also includes an electrolyte and an anode. In some embodiments, the electrochemical device is a lithium primary battery, a lithium secondary battery, a sodium primary battery, a sodium secondary battery or a capacitor.

In another aspect, a method of preparing an electroactive material includes mixing selenium or a selenium-containing compound with a carbon electronic conductor to form a selenium-carbon composite or a selenium-containing compound composite. In some embodiments, the method includes heating the selenium or selenium-containing compound with the carbon material to melt the selenium and allow the selenium to diffuse throughout the carbon material.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Selenium, selenium-containing compounds, selenium-carbon composites, selenium-containing compound-carbon composites, or mixtures of any two or more such materials are described herein for use as electroactive materials for the construction of, and use in, electrochemical devices such as electrodes, primary batteries, secondary batteries, and capacitors for operation at temperatures below the melting point of selenium. Devices constructed with the selenium electroactive materials exhibit both high capacity and long charge-discharge lifetimes. Thus, such materials find wide applications, in particular, in rechargeable batteries.

Selenium has a conductivity of about $10^{-6}$ to $10^{-7}$ S/cm (*Materials Science and Engineering*, 95, 287 (1987)), which is about 24 orders of magnitude higher than that of sulfur ($10^{-30}$ S/cm). Using a lithium anode or a sodium anode, a theoretical capacity of 678 mAh/g is achievable, based upon the formation of $Li_2Se$ or $Na_2Se$. As the selenium has a high melting point (220° C.) in comparison to that of sulfur (120° C.), batteries prepared with selenium may have higher thermal stability and be safer, especially in the event of battery overheating. The theoretical capacity of selenium (678 mAh/g) (based on $Li_2Se$) is lower than that of sulfur (1675 mAh/g), yet they have comparable volumetric specific capacities (3264 Ah/l for selenium vs. 3517 Ah/l for sulfur) due to the high volumetric density of selenium (4.80 g/cc) than that of sulfur (2.08 g/cc).

In one aspect, a material is provided including selenium, a selenium-containing compound, selenium-carbon composite, a selenium-containing compound-carbon composite, or a mixture of any two or more such materials; where the material is an electroactive material at a temperature of below 280° C. For example, the materials may be electroactive at a temperature from about −100° C. to about 150° C., or at a temperature from about 0° C. to about 100° C.

Where the material includes selenium-carbon composite and/or a selenium-containing compound-carbon composite these materials are an intimate mixture of the selenium or selenium-containing compound with carbon. The selenium or selenium-containing compound is mixed with the carbon material by simple mixing, ball milling, or grinding, melting, evaporation and/or vacuum treatment, chemical vapor deposition, thermal evaporation, plasma chemical vapor deposition, laser chemical vapor deposition, electrochemically, jet vapor deposition, or dissolving the selenium-containing compound in appropriate solvent such as, but not limited to, $CS_2$. In one particular embodiment, selenium and a carbon material are heated until the selenium melts, thereby penetrating the carbon material to be dispersed throughout. Where the carbon material is a high surface area material, the penetration allows for coverage of at least a portion of the carbon material. Suitable carbon materials for use in the selenium-carbon composite and/or selenium-containing compound-carbon composite include, but are not limited to, synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene.

The material may be then further mixed with a bulk conductive carbon material, i.e. a carbon electronic conductor, to provide an electroactive pathway for the selenium or selenium-containing compound. Suitable carbon electronic conductors include, but are not limited to, synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene. The carbon of the selenium-carbon composite and selenium-containing compound-carbon composite may the same base material as the carbon electronic conductor, however as described above the carbon electronic conductor is in addition to that which may be present in the selenium-carbon composite and selenium-containing compound-carbon composite.

Suitable selenium-containing compounds may include ionic or covalent compounds. For example, the compound may include, but is not limited to, those such as $Li_2Se$, $Se_3S$, $S_2Se$, $S_mSe_n$ (m+n>0) S—$Li_2Se$, Se—$Li_2Se$, $Na_2Se$, $Na_2Se$—$Na_2S$, $Na_2Se$—Se, $Na_xLi_yS_uSe_v$, or a selenium- or sulfur-containing polymer; wherein 0≤x, 0≤y, 0≤u≤1, 0≤v≤1, 0<(x+y), and 0<(u+v). In some embodiments, 0≤x≤1, 0≤y≤1. The selenium-containing compound may include a polymer of Formula I or II, to prevent dissolution of the selenium in the electrolyte. Formulas I and II are:

(I)

(II)

The compounds of Formulas I and II, A is Se or S and x' is an integer from 1-10, inclusive. In some embodiments, A is Se. In other embodiments, x' is 1, 2, 3, 4, or 5.

In another aspect, an electrode includes any of the above materials that include selenium, a selenium-containing compound, selenium-carbon composite, or a selenium-containing compound-carbon composite. The electrode may contain any of the materials singly or a mixture with any one or more of the other materials. In one embodiment, the electrode includes selenium. The electrodes are intended for operation at less than the melting point of the selenium or less than the temperature of a molten salt material. For example, the electrodes are operable at temperatures below 280° C. In some embodiments, the electrode is operable at a temperature below 200° C. In some embodiments, the electrode is operable at a temperature from about −100° C. to about 150° C. In other embodiments, the electrode is operable at a temperature from about 0° C. to about 100° C.

The electrodes may also contain in addition to the selenium and/or selenium-containing compounds, conventional materials for electrodes. For example, the electrode may also contain, electroactive carbon-based materials such as described above as carbon electronic conductors, transition metal chalcogenides, electroactive conductive polymers, or electroactive sulfur or sulfur compounds. As used herein, the term chalcogenide refers to compounds of oxygen, sulfur, or selenium. Examples of suitable transition metal chalcogenides include, those of Mn, V, Cr, Ti, Fe, Co, Ni, Cu, Y, Zr, Nb, Mo, Ru, Rh, Pd, Ag, Hf, Ta, W, Re, Os, or Ir. In one embodiment, the transition metal chalcogenide is an electroactive oxide of nickel, manganese, cobalt, vanadium, or a mixture of any two or more such oxides. In another embodiment, the transition metal chalcogenide is an electroactive sulfide of iron. In one embodiment, sulfur or sulfur compounds may be added to the selenium-based material to improve capacity. Such sulfur or sulfur compounds include, but are not limited to, $Li_2Se$, $Se_3S$, $S_2Se$, $S_mSe_n$ (m+n>0), $S—Li_2Se$, $Se—Li_2Se$, $Na_2Se$, $Na_2Se—Na_2S$, $Na_2Se—Se$, $Na_xLi_yS_uSe_v$, or a selenium-containing polymer; wherein $0≤x$, $0≤y$, $0≤u≤1$, $0≤v≤1$, $0<(x+y)$, and $0<(u+v)$. In some embodiments, $0≤x≤1$, $0≤y≤1$.

Carbon-based materials (carbon sources and carbon electronic conductors) suitable for use in the electrode include those which provide good electron conductors. The carbon-based materials may also be referred to as carbon electronic conductors and are in addition to any carbon that is present in the composite form with the selenium or the selenium-containing compounds. The carbon electronic conductors may be the same as the carbon in the composites, or different from the carbon in the composites. Illustrative carbon materials for use as a carbon electronic conductor include, but are not limited to, synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene.

The current collector provides contact between the electroactive material and an external load to allow for the flow of electrons through a circuit to which the electrode is connected. The current collector may be a conductive material. Illustrative current collectors include, but are not limited to, aluminum, nickel, platinum, palladium, gold, silver, copper, iron, stainless steel, rhodium, manganese, vanadium, titanium, tungsten, or aluminum carbon coated or any carbon-coated metal described above.

The electrode may also contain a binder for retaining the electroactive materials, and any non-electroactive materials in contact with the current collector. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, a copolymer of any two or more such polymers, or a blend of any two or more such polymers.

The electrodes may also contain a wide variety of other additives that are known in the art for use in electrodes. Illustrative additives include, but are not limited to, manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, or copper chloride.

The electrodes may also contain a conductive polymer. Illustrative conductive polymers include, but are not limited to, polyaniline, polypyrrole, poly(pyrrole-co-aniline), polyphenylene, polythiophene, polyacetylene, or polysiloxane.

In another aspect, electrochemical devices are provided including a cathode, where the cathode includes is an electrode as described above containing selenium, a selenium-containing compound, selenium-carbon composite or a selenium-containing compound-carbon composite, or a mixture of any two or more such materials. Such electrochemical devices include, but are not limited to, a lithium primary battery, a sodium primary battery a lithium secondary battery, a sodium secondary battery, or a capacitor. Such electrochemical devices also include an electrolyte and an anode.

The electrodes that are used as the cathode in the electrochemical devices are fully described above. Suitable anode materials for use in the electrochemical devices include, but are not limited to a wide variety of materials such as lithium metal, sodium metal, anode based carbon, a silicon-based material, tin, antimony, a tin alloy, a carbon tin alloy, a antimony alloys, a tin compound, a antimony compound, a transition metal nitride, a transition metal phosphide, a transition metal oxide, or a carbon electronic conductor. Suitable anode based carbon, include, but are not limited, synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene. Suitable anode silicon-based materials include, but are not limited to, carbon silicon composite or carbon-coated silicon. Suitable tin, antimony, and silicon materials include, but are not limited to, tin, $Sn_xCo_yC_z$, Sb, Sb—Sn and Sb—Sn—C, metal alloys of Sn and/or Sb with Si, Mg, Al, Bi and/or Ag, $Cu_2Sb$, $CoSb_3$, $SnFe_2$, $Sn_5Cu_6$, $Mn_2Sb$/Suitable transition metal nitrides or transition metal phosphides include, but are not limited to $Cu_3P$, $FeP_2$, $Li_{2.6}Co_{0.4}N$. Suitable transition metal oxides include, but are not limited to, $Li_4Ti_5O_{12}$, $SiO_2$, $SiO_x$, carbon-coated $SiO_x$, cobalt oxide, $TiO_2$, $TiO_2(B)$. Such materials for the anode may be incorporated into a carbon electronic conductor. Suitable carbon electronic conductors include, but are not limited to, synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, or graphene.

The electrochemical devices may also include adsorption compounds which has a strong affinity for polyselenides or polysulfides. Such adsorptions compounds include, but are not limited to, carbon, silica, silica aerogel, aluminum oxides, hydrated aluminum, non-electroactive transition metal chalcogenide wherein the transition metal is at least one selected from the group consisting of: Ti, V, Cr, Mn, Fe, Nb, Mo, Ta, W, Co, Ni, Cu, Y, Zr, Ru, Rh, Pd, Hf, Re, Os, and Ir; and the chalogenide is at least one selected from the group consisting of: O, S, and Se, such as a crystalline vanadium oxide aerogel, or metals like palladium.

The electrochemical devices also include an electrolyte. Such electrolytes include a salt and a solvent. Suitable salt materials include, but are not limited to, a lithium salt, a sodium salt, an ammonium salt, an alkylammonium salt, a lithium polysulfide, a or a lithium polyselenide. Illustrative salts are $LiPF_6$, $LiClO_4$, $(C_4BO_8Li)$, $(C_2BO_4F_2Li)$, $LiPF_4C_2O_4$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n}H_n$, where X is a halogen, n is an integer from 0 to 12, and n' is an integer from 0 to 10, $LiAlF_4$, $LiBF_4$, $Li(FSO_2)_2N$, $Li_2SO_4$, $Na_2SO_4$, $NaPF_6$, $NaClO_4$, $LiAlO_2$ LiSCN, LiBr, LiI, $LiAsF_6$, $LiB(Ph)_4$, $LiSO_3CH_3$, $Li_2Se_{x'''}$, $(LiS_{x''}R)_y$, or $(LiSe_{x''}R)_y$; wherein x" is an integer from 1 to 20, y is an integer from 1 to 3 and R is H, alkyl, alkenyl, aryl, ether, F, $CF_3$, $COCF_3$, $SO_2CF_3$, or $SO_2F$.

Suitable solvents for use in the electrolytes are typically polar aprotic solvents. Illustrative solvents include, but are not limited to, ethylene carbonate (EC), dimethylcarbonate (DMC), diethylcarbonate (DEC), propylene carbonate (PC), dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile. Of course, a mixture of any two or more such solvents may also be used. In some embodiments the solvent is a mixture of solvents such as, but not limited to, EC-DMC, EC-DEC, EC-PC, EC-PC-DMC, EC-PC-DEC, or EC-DEC-DMC. In some embodiments, fluorinated derivatives of the above solvents may be used.

In yet other embodiments, the electrolyte includes a lithium salt and an ionic liquid. Suitable ionic liquids include, but are not limited to, imidazolium, phophazenes, pyrrolidinium, dimethylammonium, piperidinium, and phosphonium salts which are liquids at room temperature, or at the operating temperature of the electrochemical device incorporating the ionic liquid.

In some embodiments, the electrolyte is an aqueous electrolyte. Aqueous electrolytes include water and a salt or other ionic material that are stable in water such as $Li_2SO_4$, $Na_2SO_4$, LiOH, NaOH, NaCl, LiCl, $LiNO_3$, or $NaNO_3$.

According to some embodiments, the electrolyte includes a gel electrolyte. In some such embodiments, the gel electrolyte includes, but is not limited to, polyethylene oxide (PEO), polyethylene-methylene oxide (PEMO), polyvinylidene fluoride (PVdF), polyethylene glycol (PEG), poly(methyl methacrylate), polypropylene oxides, polysiloxanes, crosslinked silanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, or co-polymers or blends thereof.

According to some embodiments, the electrolyte includes a siloxane. Illustrative examples of siloxanes include, but are not limited to, $(CH_3)_3SiO(CH_2CH_2O)_nCH_3$; $(CH_3)_3SiCH_2$—O—$(CH_2CH_2O)_1CH_3$; $(CH_3)_3Si(CH_2)_3O(CH_2CH_2O)_nCH_3$; $(CH_3)_2Si[O(CH_2CH_2O)_nCH_3]_2$; $CH_3Si[O(CH_2CH_2O)_pCH_3]_3$; $Si[O(CH_2CH_2O)_pCH_3]_4$; $(CH_3)_2Si[O(CH_2CH_2O)_nCH_3][(CH_2)_3$—O—$(CH_2CH_2O)_nCH_3]$; $(CH_3)_3SiOR$; $(CH_3)_3$ $Si(CH_2)_3$ OR; $CH_3O(CH_2CH_2O)_nSi(CH_3)_2O(CH_3)_2SiO(CH_2CH_2O)_nCH_3$, $CH_3O(CH_2CH_2O)_nCH_2Si(CH_3)_2O(CH_3)_2SiCH_2O(CH_2CH_2O_nCH_3$, $CH_3O(CH_2CH_2O)_n(CH_2)_3Si(CH_3)_2O)(CH_3)_2Si(CH_2)_3O(CH_2CH_2O)_nCH_3$, $(CH_3)_3SiO(CH_3)_2Si(CH_2)_3O(CH_2CH_2O_nCH_3$, $(CH_3)_3SiO(CH_3)_2Si(CH_2)_2O(CH_2CH_2O_nCH_3$, $(CH_3)_3SiO(CH_3)_2SiO(CH_2CH_2O_nCH_3$, $(CH_3)_3SiO(CH_3)_2SiOR$; $ROSi(CH_3)_2O(CH_3)_2SiO$—R; $(CH_3)_3SiO(CH_3)_2Si(CH_2)_3OR$; $RO(CH_2)_3Si(CH_3)_2O(CH_3)_2Si(CH_2)_3OR$; $CH_3O(CH_2CH_2O_nSi(CH_3)_2OSi(CH_3)_2O(CH_3)_2SiO(CH_2CH_2O_nCH_3$, $CH_3O(CH_2CH_2O)_{n'}(CH_2)_3Si(CH_3)_2OSi(CH_3)_2O(CH_3)_2Si(CH_2)_3O(CH_3)_2Si$—$(OCH_2CH_2)_nOCH_3$, $[(CH_3)_3SiO]_2Si(CH_3)O(CH_2CH_2O)_nCH_3$, $[(CH_3)_3SiO]_2Si(CH_3)(CH_2)_3O(CH_2CH_2O_nCH_3$, $[(CH_3)_3SiO]_2Si(CH_3)O(CH_2CH_2O)_n(CH_3)Si[OSi(CH_3)_3]_2$, $ROSi(CH_3)_2OSi(CH_3)_2O(CH_3)_2SiOR$, $ROSi(CH_3)_2OSi(CH_3)_2OSi(CH_3)_3$, $RO(CH_2)_3Si(CH_3)_2OSi(CH_3)_2O(CH_3)_2Si(CH_2)_3$ OR, $RO(CH_2)_3$ $Si(CH_3)_2OSi(CH_3)_2OSi(CH_3)_3$; $ROSi(CH_3)_2OSi(CH_3)_2O(CH_3)_2SiO(CH_2CH_2O)_nCH_3$, or $RO(CH_2)_3Si(CH_3)_2OSi(CH_3)_2O(CH_3)_2Si(CH_2)_3O(CH_2CH_2)_1CH_3$; where R is a carbonate group; n is 2, 3, 4, 5, 6, or 7; n' is 2, 3, 4, or 5; p is 2, 3, or 4; and p' is 2 or 3.

According to some embodiments, the electrolyte includes a sulfones. Sulfones suitable for incorporation into the electrolyte include, but are not limited to, those as represented by Formula III:

Formula III where $R^1$ and $R^2$ are individually a $C_1$-$C_7$ alkyl group that is unsubstituted, or is substituted with one or more fluorine atoms; or a $C_1$-$C_7$ group having one or more oxygen atoms; or $R^1$ and $R^2$ join together to form a cyclic alkyl that is unsubstituted or is substituted with one or more fluorine atoms.

According to some embodiments, the electrolyte includes a fluorinated carbonate that may be represented by Formula IV:

Formula IV where $R^3$ is a fluorine-containing alkyl group, a fluorine-containing alkoxyl group or a fluorine-containing ether group with two or more carbon atoms; $R^4$ and $R^5$ are individually H, F, Cl, $CF_3$ or $CH_3$; and $R^6$ is H, F, Cl or an alkyl group According to some embodiments, the electrolyte includes a fluorinated carbonate that may be represented by Formula V:

Formula V wherein $R^7$ and $R^8$ are individually a fluorine-containing $C_1$ to $C_8$ alkyl group, a fluorine-containing $C_1$ to $C_8$ alkoxyl group or a fluorine-containing $C_1$ or $C_2$ ether group.

According to other embodiments, the electrolyte is a solid electrolyte. Illustrative solid electrolytes may include, but are not limited to, $Li_3PO_4$, $Li_{3.25}Ge_{0.25}P_{0.75}S_4$, a lithium lanthanum titanium oxide (LLTO), $Li_{1.3}Al_{0.3}Ti_{1.7}(PO_4)_3$, $Li_{14}ZnGe_4O_{16}$, $Li_6La_2BaTa_2O_{12}$, mesoporous $LiTaO_3$, LiPON, sulfide glass, $Li_2S—P_2S_5$, or $60Li_2S.40SiS_2$. In one embodiment, the electrolyte may be a mixture of plastic crystal (e.g. succinonitrile) doped with a lithium salt.

The electrochemical devices may also include an anion receptor to improve the battery cycle life. Illustrative anion receptors include, but are not limited to, bis(1,1,1,3,3,3-hexafluoroisopropyl)pentafluorophenylboronate, tris(2,6-difluorophenyl)boroxin, tris(2,4,6-trifluorophenyl)boroxin, tris(pentafluorophenyl)borate, and/or tris(hexafluoroisopropyl)borate. In another aspect, the anion receptor may be substituted with the halogen fluorine. For example, anion receptors of the invention include but are not limited to tris (1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl) borate, tris(2,3,5,6-tetrafluorophenyl)borate, tris(pentafluorophenyl)borate, tris(3-(trifluoromethyl)phenyl)borate, tris (3,5-bis(trifluoromethyl)phenyl)borate, tris (pentafluorophenyl)borane, or a mixture of any two or more thereof. Further suitable additives include 2-(2,4-difluorophenyl)-4-fluoro-1,3,2-benzodioxaborole, 2-(3-trifluoromethyll phenyl)-4-fluoro-1,3,2-benzodioxaborole, 2,5-bis (trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis (trifluoromethyl)-1,3,2-dioxaborolane, bis(1,1,1,3,3,3-hexafluoroisopropyl)phenyl-boronate, bis(1,1,1,3,3,3-hexafluoroisopropyl)-3,5-difluorophenylboronate, bis(1,1,1,3,3,3-hexafluoroisopropyl)pentafluorophenylboronate, or a mixture of any two or more thereof. In one embodiment, the anion receptor additive includes tris(pentafluorophenyl)borane.

The electrochemical devices may also include an electrolyte stabilizing compound which protect the electrodes from degradation. The electrolyte stabilizing compound is one that is reduced or polymerized on the surface of a negative electrode to form a passivation film on the surface of the negative electrode. Such compounds may be present in the electrolyte at a concentration from about 0.001 wt % to about 8 wt %. Illustrative electrode stabilizing compounds include, but are not limited to, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro [5.5]undecane, 3,9-dimethylene-2,4,8,10-tetraoxaspiro[5.5] undecane, 3,9-divinyl-1,5,7,11-tetraoxaspiro[5.5]undecane, 3,9-dimethylene-1,5,7,11-tetraoxaspiro[5.5]undecane, 3,9 diethylidene-1,5,7,11-tetraoxaspiro[5.5]undecane, or a mixture of any two or more thereof. Other electrode stabilizing compounds include, spirocyclic hydrocarbons containing at least one oxygen atom and at least one alkenyl or alkynyl group. For example, such stabilizing additives include those having Formula IV:

IV $$\begin{matrix} B^1-G^1 & G^3-B^3 \\ R^{20} & \diagdown\diagup & R^{21} \\ & \diagup\diagdown & \\ B^2-G^2 & G^4-B^4 \end{matrix}$$

where $B^1$, $B^2$, $B^3$, and $B^4$ are independently O or $CR^{22}R^{23}$; provided that $B^1$ is not O when $G^1$ is O, $B^2$ is not O when $G^2$ is O $B^3$ is not O when $G^3$ is O and $B^4$ is not O when $G^4$ is O; $G^1$, $G^2$, $G^3$, and $G^4$ are independently O or $CR^{22}R^{23}$; provided that $G^1$ is not O when $B^1$ is O, $G^2$ is not O when $B^2$ is O, $G^3$ is not O when $B^3$ is O, and $G^4$ is not O when $B^4$ is O; $R^{20}$ and $R^{21}$ are independently a divalent alkenyl or alkynyl group; and $R^{22}$ and $R^{23}$ at each occurrence are independently H, F, Cl, a alkyl, alkenyl, or alkynyl group.

Representative examples of Formula IV include, but are not limited to, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro [5.5]undecane, 3,9-dimethylene-2,4,8,10-tetraoxaspiro[5.5] undecane, 3,9-divinyl-1,5,7,11-tetraoxaspiro[5.5]undecane, 3,9-dimethylene-1,5,7,11-tetraoxaspiro[5.5]undecane, 3,9 diethylidene-1,5,7,11-tetraoxaspiro[5.5]undecane, or a mixture of any two or more thereof.

In another aspect, a method is provided for preparing the active material described above. Such a method include mixing selenium or a selenium-containing compound with a carbon source. During mixing the method may include heating the selenium or selenium-containing compound with the carbon source. This can be conducted by simple mixing, ball milling, or grinding, melting, evaporation and/or vacuum treatment, chemical vapor deposition, thermal evaporation, plasma chemical vapor deposition, laser chemical vapor deposition, electrochemically, jet vapor deposition, or dissolving the selenium-containing compound in appropriate solvent such as, but not limited to, $CS_2$. As noted above, this mixing is intended to disperse the selenium or selenium-containing compound throughout the surface of the carbon material. Once an intimate mixture of the material is obtained, the material may be mixed with additional carbon electronic conductors, as described above.

The methods may also include preparing the selenium-containing compounds. For example, $Li_2Se$, $Na_2Se$ and $Na_x Li_y S_u Se_v$ where $0 \leq x$, $0 \leq y$, $0 \leq u \leq 1$, $0 \leq v \leq 1$, $0 < x+y$, and $0 < (u+v)$, may be prepared electrochemically by lithiation or (sodiation) of Se, or chemically by adding Se to molten lithium or molten sodium just above their melting point. In some embodiments, $0 \leq x \leq 1$, $0 \leq y \leq 1$. In some embodiments, the $Na_2Se$ or $Li_2Se$ is prepared according to the reactions described below:

(1)

(2)

(3)

The methods may also include mixing with the selenium or selenium-containing compound and carbon with a binder. Such binders are described above.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups.

Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=CHCH$_3$.

Alkynyl groups are straight chain or branched alkyl groups having 2 to about 20 carbon atoms, and further including at least one triple bond. In some embodiments alkynyl groups have from 1 to 12 carbons, or, typically, from 1 to 8 carbon atoms. Alkynyl groups may be substituted or unsubstituted. Exemplary alkynyl groups include, but are not limited to, ethynyl, propynyl, and butynyl groups. Alkynyl groups may be substituted similarly to alkyl groups. Divalent alkynyl groups, i.e., alkynyl groups with two points of attachment, include but are not limited to CH—C=CH.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

Preparation of cathode electrode: Selenium was mixed with mesoporous carbon (500 nm) in a planetary ball milling for 15 minutes with selenium to carbon weight ratio of 4 to 1. The selenium/carbon mixture (80 wt %) was slurried along with solution of polyvinylidene fluoride (PVDF; 10 wt %) in N-Methylpyrrolidone (NMP) and acetylene black (10 wt %). The slurry was applied to an aluminum current collector using a doctor blade and heated at 75° C. to evaporate the NMP solvent.

Example 2

Preparation of a coin cell. The cathode of Example 1 was incorporated into a coin cell with an anode of lithium metal and an electrolyte of $LiPF_6$ in ethylene carbonate (EC)/ethyl methyl carbonate (3:7). A trilayer separator (available from Celgard, 25 μm) was also included in the coin cell.

Example 3

Figure 1:
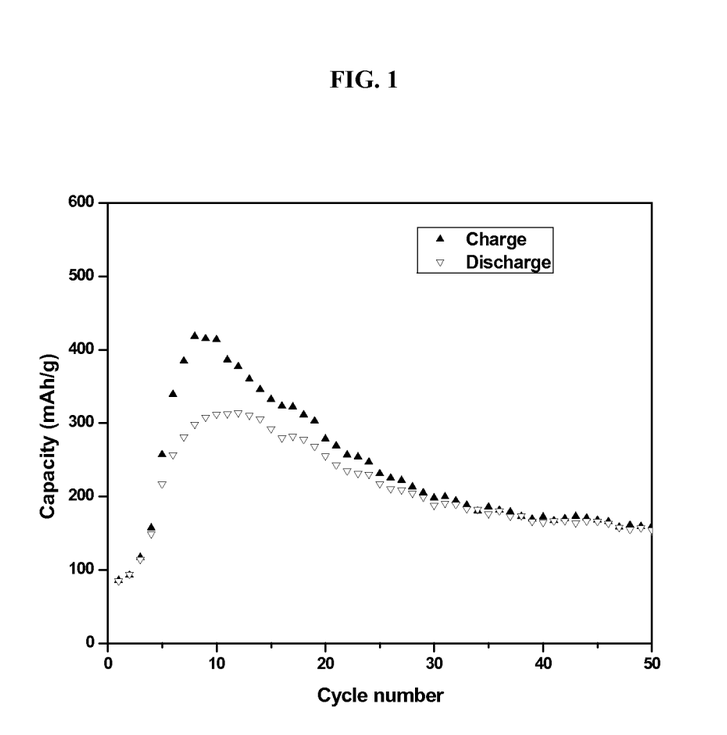
FIG. 1 shows a cycleability performance of the Li/Se battery where the selenium was mixed with mesoporous carbon, according to Example 3.
Figure 2:
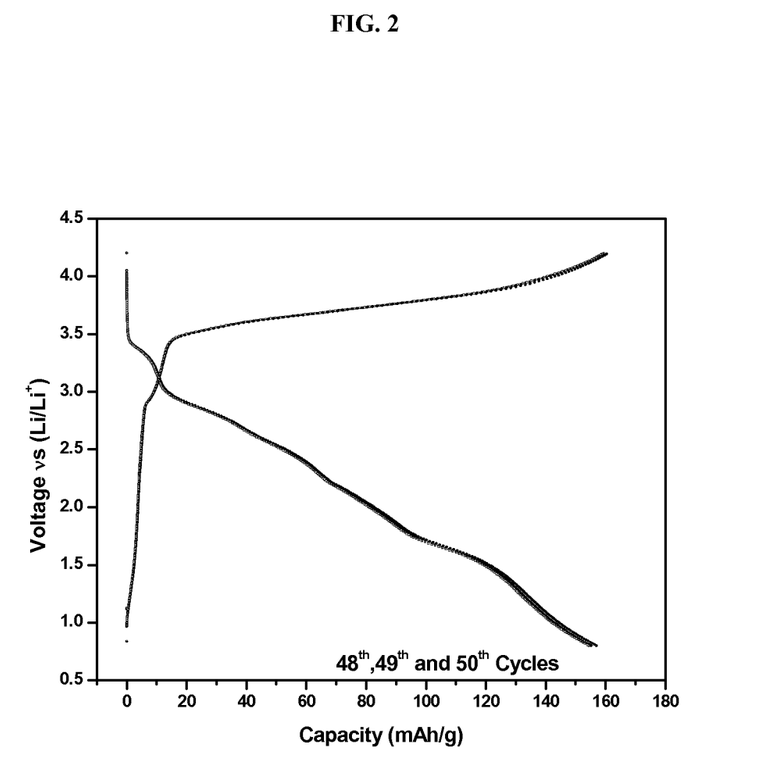
FIG. 2 shows the voltage profile of the $48^{th}$, $49^{th}$ and $50^{th}$ cycle of the Li/Se battery where the selenium was mixed with mesoporous carbon, according to Example 3.

Testing of the coin cell. The coin cell was cycled at 20 mAh/g, based on the active material, between 0.8V and 4.2V. FIG. 1 is a graph of the charge-discharge capacity for 50 cycles with a capacity about 160 mAh/g after 50 cycles. FIG. 2 is a graph of the voltage profile of the coin cell for cycles 48, 49, and 50. An average voltage output of 2.5V was observed.

Example 4

Preparation of a selenium cathode with heating. Using the same procedure as Example 1, a mixture of selenium and mesoporous carbon was prepared at the stated ratio. However, prior to preparation of the slurry the selenium/carbon mixture was heated at 260° C. for 2 hours. It is believed that this treatment melts the selenium thereby improving the mixing of the components and allowing the selenium to enter the pores of the mesoporous carbon.

Example 5

Preparation of a coin cell with the heated selenium/carbon cathode. A coin cell was prepared according to Example 2, but with the heated selenium/carbon cathode of Example 4.

Example 6

Figure 3:
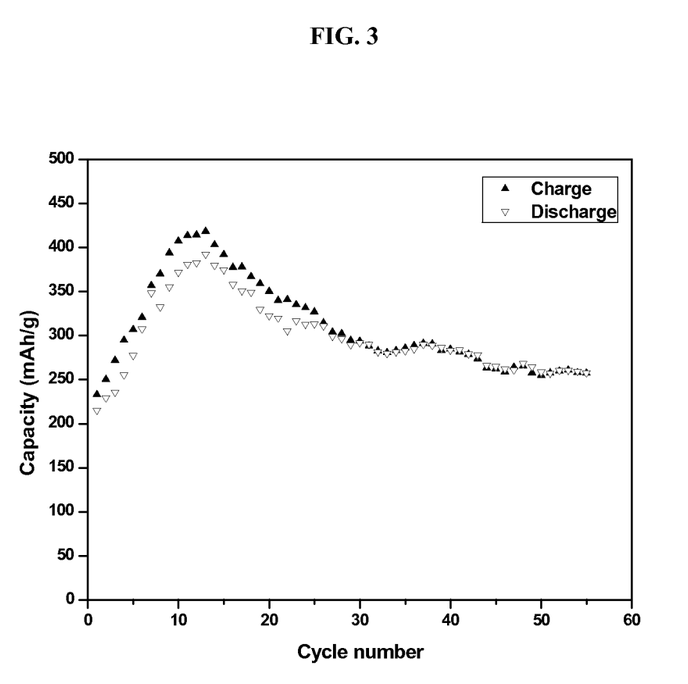
FIG. 3 shows a cycleability performance of the Li/Se battery where the selenium was mixed with mesoporous carbon and heated at 260° C. for 2 hours, according to Example 6.
Figure 4:
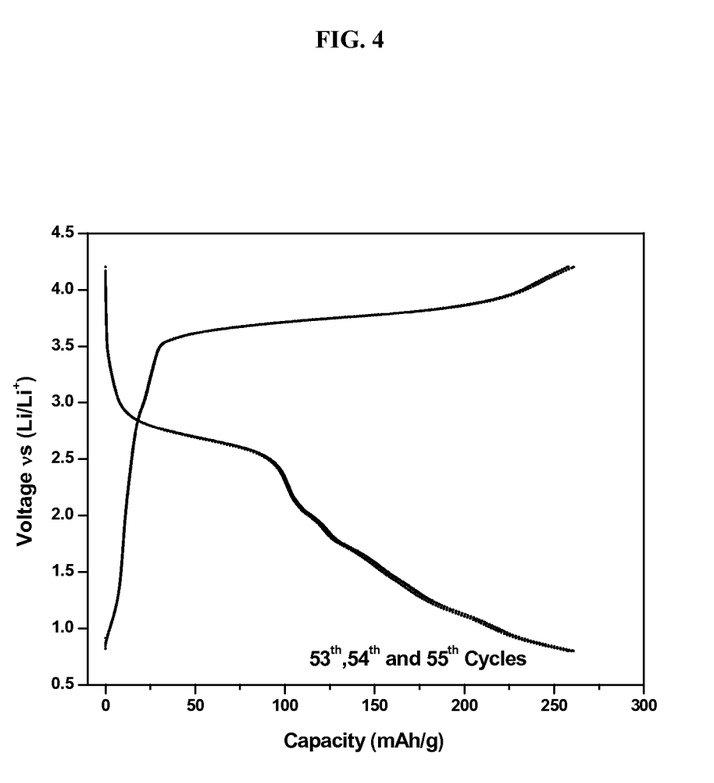
FIG. 4 shows the voltage profile of the $53^{th}$, $54^{th}$ and $55^{th}$ cycle of the Li/Se battery where the selenium was mixed with mesoporous carbon and heated at 260° C. for 2 hours, according to Example 6.

Testing of the coin cell of Example 5. The battery was cycled at 20 mAh/g, based on the active material, between 0.8V and 4.2V. FIG. 3 is a graph of the charge-discharge capacity for 55 cycles with a final capacity about 350 mAh/g. FIG. 4 is a graph of the voltage profile of the prepared coin cell for cycles 53, 54, and 55. An average voltage output of 2.5V was observed. As illustrated by FIG. 3, the heating of the selenium with the mesoporous carbon improves the charge-discharge capacities as compared to the non-heated selenium cathode. For example, the heated selenium/carbon cathode exhibits a capacity of about 260 mAh/g after 55 cycles, compared to about 160 mAh/g after 50 cycles for the non-heated cathode.

Example 7

Preparation of a selenium/CNT cathode element. Selenium was mixed with carbon nanotubes (from Aldrich CNT; multiwalled with medium diameter of 6.6 nm)) in a planetary ball milling apparatus for 15 minutes with at a selenium to carbon weight ratio of 7 to 3. The selenium/CNT mixture was then pelletized and subjected to heating at 260° C. for 12 hours, and cooled. The selenium/CNT pellet was then ground to a powder. The selenium/CNT powder (70 wt %) was slurried along with solution of polyvinylidene fluoride (PVDF; 20 wt %) in N-Methylpyrrolidone (NMP) and acetylene black (10 wt %). The slurry was applied to an aluminum current collector using a doctor blade and heated at 75° C. to evaporate the NMP solvent.

Example 8

Preparation of a coin cell with the selenium/CNT cathode. A coin cell was prepared according to Example 2, but with the selenium/CNT cathode of Example 7.

Example 9

Figure 5:
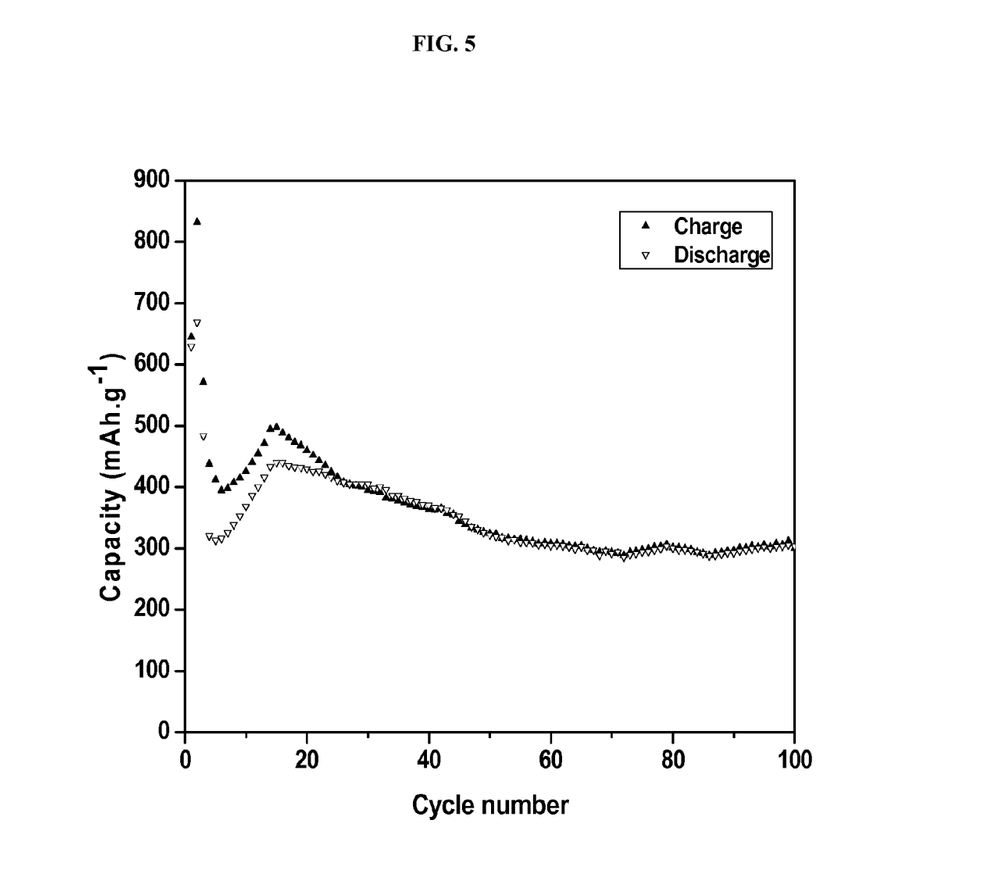
FIG. 5 shows a cycleability performance of the Li/Se battery where the selenium was mixed with carbon nanotube and heated at 260° C. for 12 hours, according to Example 9.
Figure 6:
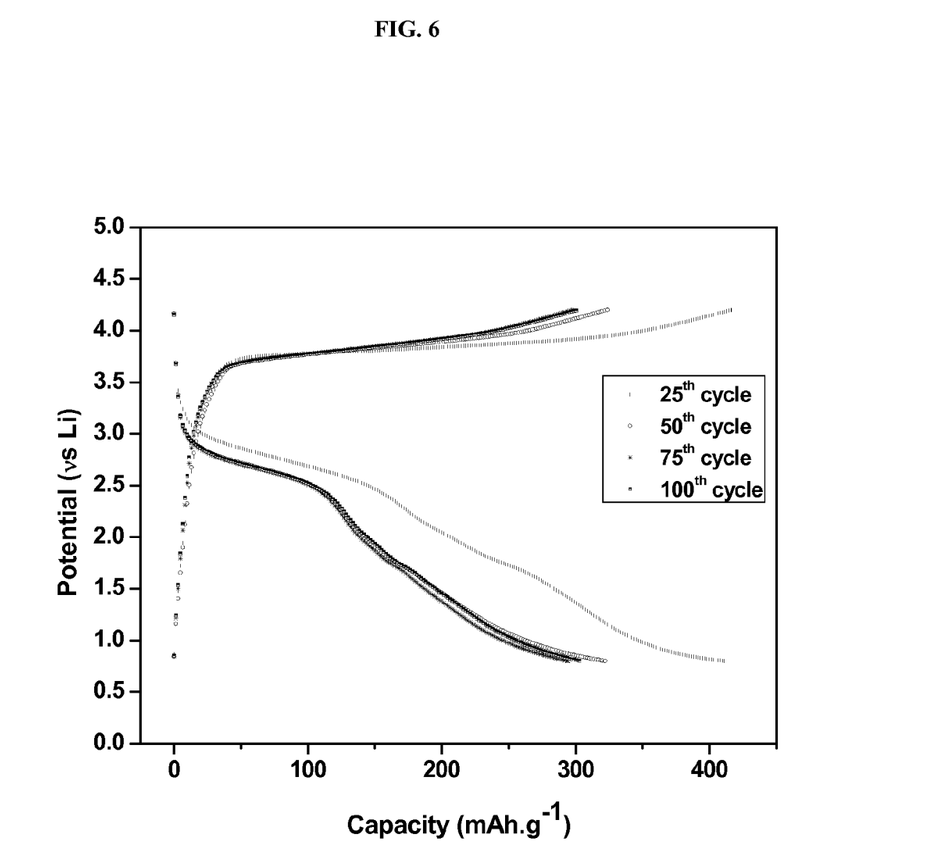
FIG. 6 shows the voltage profile of the $53^{th}$, $54^{th}$ and $55^{th}$ cycle of the Li/Se battery where the selenium was mixed with carbon nanotube and heated at 260° C. for 12 hours, according to Example 9.

Testing of the coin cell of Example 8. The battery was cycled at 50 mAh/g, based on the active material, between 0.8V and 4.2V. FIG. 5 is a graph of the charge-discharge capacity of the cell for 100 cycles with a final capacity about 300 mAh/g after 100 cycles. FIG. 6 is the voltage profile of the prepared coin cell during cycles 50, 75, and 100. An average voltage output of 2.5V was observed. The melting of the selenium with carbon nanotube further improves the performance upon the charge-discharge capacity of Example 6. For example, the capacity for the selenium/CNT cathode is 300 mAh/g after 100 cycles which is greater than the 260 mAh/g observed for the heated selenium/mesoporous carbon after only 55 cycles.

Example 10

Figure 7:
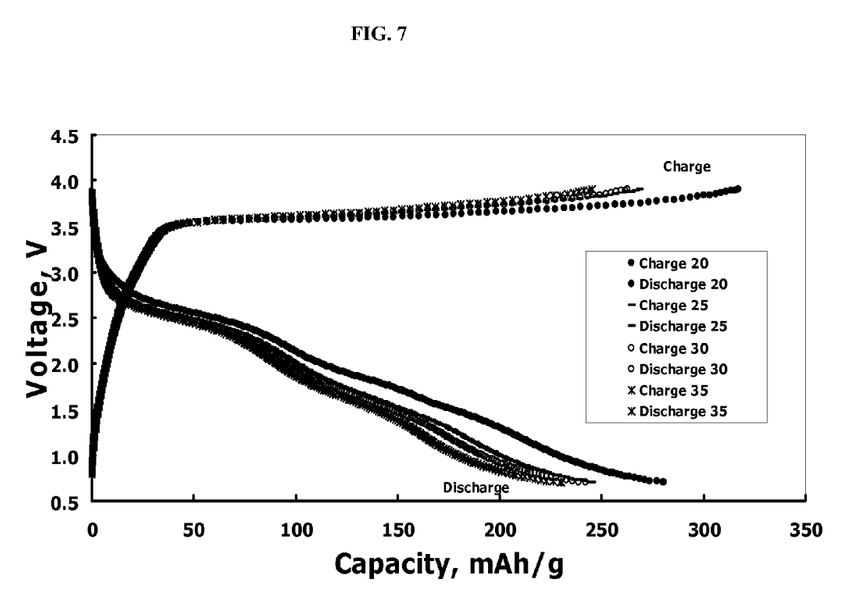
FIG. 7 shows the charge-discharge capacity profile of the $20^{th}$, $25^{th}$, $30^{th}$ and $35^{th}$ cycle of the Na/Se battery where the selenium was mixed with carbon nanotube and heated at 260° C. for 6 hours, according to Example 10.

Use of the selenium/CNT cathode in other batteries. The selenium/CNT cathode of Example 8 fabricated into a sodium battery. A coin cell was prepared using the selenium/CNT cathode with sodium foil as an anode, with 1 M NaPF$_6$ in EC/EMC (3:7) by weight and a trilayer separator. The battery was cycled between 0.7V and 3.9V. A rechargeable capacity of 230 mAh/g was sustained even after 35 cycles (FIG. 7).

Example 11

In order to show the reversibility of lithium and sodium insertion in a selenium sulfur mixture SeS$_2$ was used as an example. The SeS$_2$/CNT cathode material was prepare from a mixture of SeS$_2$ (from Aldrich) and carbon nanotubes (from Aldrich CNT; multiwalled with medium diameter of 6.6 nm)) in a planetary ball milling apparatus for 5 minutes with a SeS$_2$: carbon weight ratio of 7:3. The SeS$_2$/CNT mixture was heated at 160° C. for 12 hours, and cooled. The SeS$_2$/CNT powder (70 wt %) was slurried along with solution of tetrafluoroethylene-vinylidene fluoride copolymer (VTB; 20 wt %) in N-Methylpyrrolidone (NMP) and acetylene black (10 wt %). The slurry was applied to an aluminum current collector using a doctor blade and heated at 75° C. to evaporate the NMP solvent.

Example 12

Preparation of a coin cell with the a SeS$_2$/CNT cathode. A coin cell was prepared according to Example 2, but with the SeS$_2$/CNT cathode of Example 11.

Example 13

Figure 8:
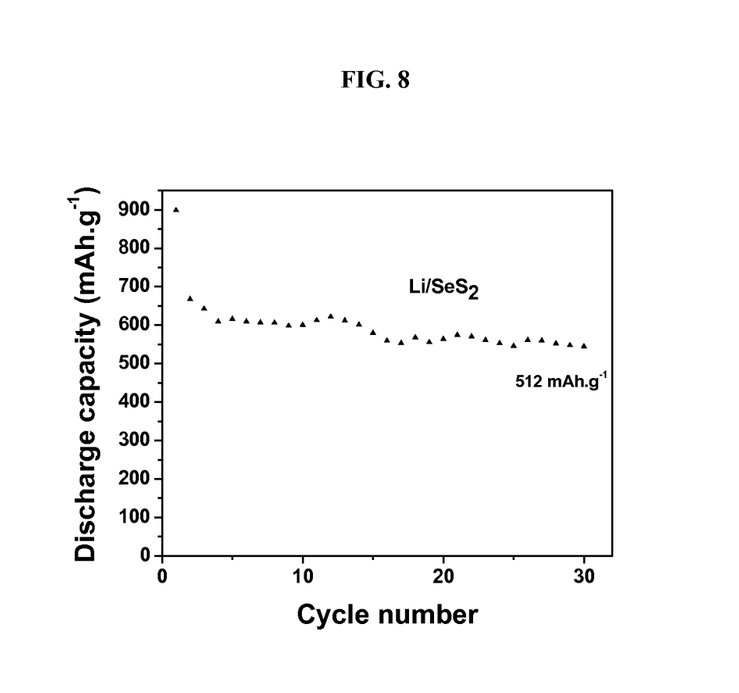
FIG. 8 shows the charge-discharge capacity profile of the $20^{th}$, $25^{th}$, $30^{th}$ and $35^{th}$ cycle of the $SeS_2$—CNT/Li battery, according to Example 13.

The coin cell of Example 12 was cycled at 50 mAh/g, based on the active material, between 0.8V and 4.6V. FIG. 8 is a graph of the cycling performance for 30 cycles of the CNT SeS$_2$/Li system. A capacity about 512 mAh.g$^{-1}$ was sustained after 30 cycles.

Example 14

Figure 9:
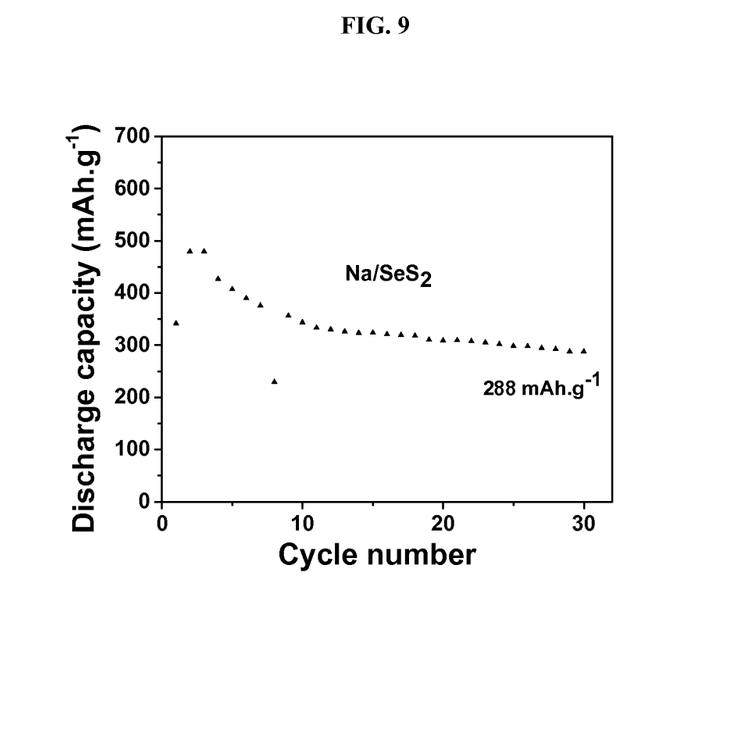
FIG. 9 shows the charge-discharge capacity profile of the $20^{th}$, $25^{th}$, $30^{th}$ and $35^{th}$ cycle of the $SeS_2$—CNT/Na battery, according to Example 14.

A coin cell similar to that of Example 12 was also prepared with the CNT SeS$_2$ cathode of Example 11, but with a sodium (Na) anode. The CNT SeS$_2$/Na battery was cycled at 50 mAh/g, based on the active material, between 0.7V and 3.9V. FIG. 9 is a graph of the cycling performance for 30 cycles of the CNT SeS$_2$/Na system. A capacity about 288 mAh.g$^{-1}$ was sustained after 30 cycles, While certain embodiments have been illustrated and described, it should be understood that changes and modifications can be made therein in accordance with ordinary skill in the art without departing from the technology in its broader aspects as defined in the following claims.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrode comprising:

$Se_3S$ or a selenium-containing polymer of Formula I or II;

wherein:
   A is Se; and
   x' is an integer from 1-10, inclusive;
   a carbon electronic conductor;
   a current collector; and
   a binder;
   wherein:
   the electrode is configured to operate at a temperature of less than 280° C.

2. The electrode of claim 1, wherein the electrode is configured to operate at a temperature from about −100° C. to about 150° C.

3. The electrode of claim 1, wherein the carbon electronic conductor comprises synthetic graphite, natural graphite, amorphous carbon, hard carbon, soft carbon, acetylene black, mesocarbon microbeads, carbon black, Ketjen black, mesoporous carbon, porous carbon matrix, carbon nanotube, carbon nanofiber, or graphene.

4. The electrode of claim 1 further comprising an electroactive transition metal chalcogenide, an electroactive conductive polymer, sulfur, or a sulfur-containing compound.

5. The electrode of claim 1 comprising the selenium containing polymer that is a polymer of Formula I.

6. The electrode of claim 1 comprising the selenium containing polymer that is a polymer of Formula II.

7. The electrode of claim 1 comprising $Se_3S$.

8. The electrode of claim 1, wherein the binder comprises polyvinylidene fluoride, polyvinyl alcohol, polyethylene, polystyrene, polyethylene oxide, polytetrafluoroethylene, polyacrylonitrile, polyimide, styrene butadiene rubber, carboxy methyl cellulose, gelatine, a copolymer of any two or more such polymers, or a blend of any two or more such polymers.

9. An electrochemical device comprising a cathode, wherein the cathode comprises a material comprising:

$Se_3S$ or a selenium-containing polymer of Formula I or II;

wherein:
   A is Se; and
   x' is an integer from 1-10, inclusive;
   wherein the material is an electroactive material at a temperature of below 280° C.

10. The electrochemical device of claim 9 that is a lithium primary battery, a lithium secondary battery, a sodium primary battery, a sodium secondary battery or a capacitor.

11. The electrochemical device of claim 10 further comprising an electrolyte and an anode.

12. The electrochemical device of claim 11, wherein the electrolyte comprises a salt and a solvent.

* * * * *